United States Patent
Mori

(10) Patent No.: US 9,491,262 B2
(45) Date of Patent: Nov. 8, 2016

(54) NON-TRANSITORY COMPUTER READABLE MEDIUM, SERVER AND SYSTEM

(71) Applicant: Takafumi Mori, Nagoya (JP)

(72) Inventor: Takafumi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 111 days.

(21) Appl. No.: 14/207,973

(22) Filed: Mar. 13, 2014

(65) Prior Publication Data

US 2014/0280512 A1   Sep. 18, 2014

(30) Foreign Application Priority Data

Mar. 15, 2013  (JP) ................................ 2013-053750

(51) Int. Cl.
  *H04L 29/06*   (2006.01)
  *H04L 29/08*   (2006.01)

(52) U.S. Cl.
  CPC .............. *H04L 67/42* (2013.01); *H04L 29/06* (2013.01); *H04L 63/02* (2013.01); *H04L 67/02* (2013.01)

(58) Field of Classification Search
  USPC ....... 709/203–205, 223, 227, 247, 250, 226, 709/210, 229
  See application file for complete search history.

(56) References Cited

U.S. PATENT DOCUMENTS

| | | | |
|---|---|---|---|
| 8,417,128 B2 | 4/2013 | Naito | |
| 2001/0048375 A1* | 12/2001 | Maruyama et al. | H01H 1/0015 340/870.11 |
| 2001/0055125 A1 | 12/2001 | Yamada et al. | |
| 2002/0054323 A1 | 5/2002 | Yamada et al. | |
| 2003/0137277 A1* | 7/2003 | Mori | G01R 31/3648 320/132 |
| 2004/0093523 A1 | 5/2004 | Matsuzaki et al. | |
| 2005/0152387 A1* | 7/2005 | Utsunomiya et al. | H04B 7/061 370/431 |
| 2005/0157848 A1* | 7/2005 | Miyauchi et al. | A61B 6/56 378/207 |
| 2009/0055241 A1* | 2/2009 | Chen | G06Q 30/02 705/7.34 |
| 2009/0292767 A1* | 11/2009 | Wen | H04L 67/02 709/203 |

(Continued)

FOREIGN PATENT DOCUMENTS

| | | | |
|---|---|---|---|
| JP | 2002-082792 A | 3/2002 |
| JP | 2010-087777 A | 4/2010 |
| JP | 2011-028628 A | 2/2011 |
| JP | 2011-159232 A | 8/2011 |

OTHER PUBLICATIONS

Non-Final Office Action issued on May 21, 2015 in U.S. Appl. No. 14/209,111.

(Continued)

*Primary Examiner* — Jude Jean Gilles
(74) *Attorney, Agent, or Firm* — Banner & Witcoff, Ltd.

(57) ABSTRACT

A server may receive information from one or more service providing apparatuses. Computer-readable instructions may cause the server to store device identification information, type information, and/or a transmission condition in association with service identification information. The server may receive device state information from one or more information devices when an information device determines that a transmission condition is satisfied. The server may also store the received device state information in association with device identification information identifying a specific information device, which transmitted the device state information. Further, the server may transmit, to a specific service providing apparatus, identified by specific service identification information, the device state information stored in association with the specific service identification information.

20 Claims, 12 Drawing Sheets

(56) References Cited

U.S. PATENT DOCUMENTS

| | | | |
|---|---|---|---|
| 2010/0273455 A1* | 10/2010 | Tamura | H04L 51/14 455/412.1 |
| 2011/0001999 A1 | 1/2011 | Nanaumi | |
| 2011/0026942 A1 | 2/2011 | Naito | |
| 2011/0222102 A1 | 9/2011 | Ito | |
| 2012/0246502 A1* | 9/2012 | Koga | H04N 1/00896 713/323 |
| 2012/0303323 A1* | 11/2012 | Ha | D06F 33/02 702/183 |
| 2012/0307283 A1 | 12/2012 | Hamada | |

OTHER PUBLICATIONS

Extended European Search Report issued on Nov. 20, 2014 in Application No. 14158918.4.
Final Office Action issued on Sep. 24, 2015 in U.S. Appl. No. 14/209,11.
Apr. 12, 2016—(JP) Notice of Reasons for Rejection—App 2013-053750.
Jul. 25, 2016—(CN) Notification of First Office Action—App 201410095407.7.

* cited by examiner

Fig.3
241

| Service ID | Device ID | Serial number | Type information | Device state information | Period information | Flag information |
|---|---|---|---|---|---|---|
| 0001 | X01234 | 0001 | The number of printing | 60042 | 24-hour | 1 |
| | X56789 | 0002 | The number of printing | 3021 | 30-day | 0 |
| | | | The number of rotating | 45760 | 6-hour | 1 |
| 0002 | Y56789 | 0003 | The number of printing | 28764 | 15-day | 0 |
| — | — | — | — | — | — | — |
| : | : | : | | | : | : |
| : | : | : | | | : | : |

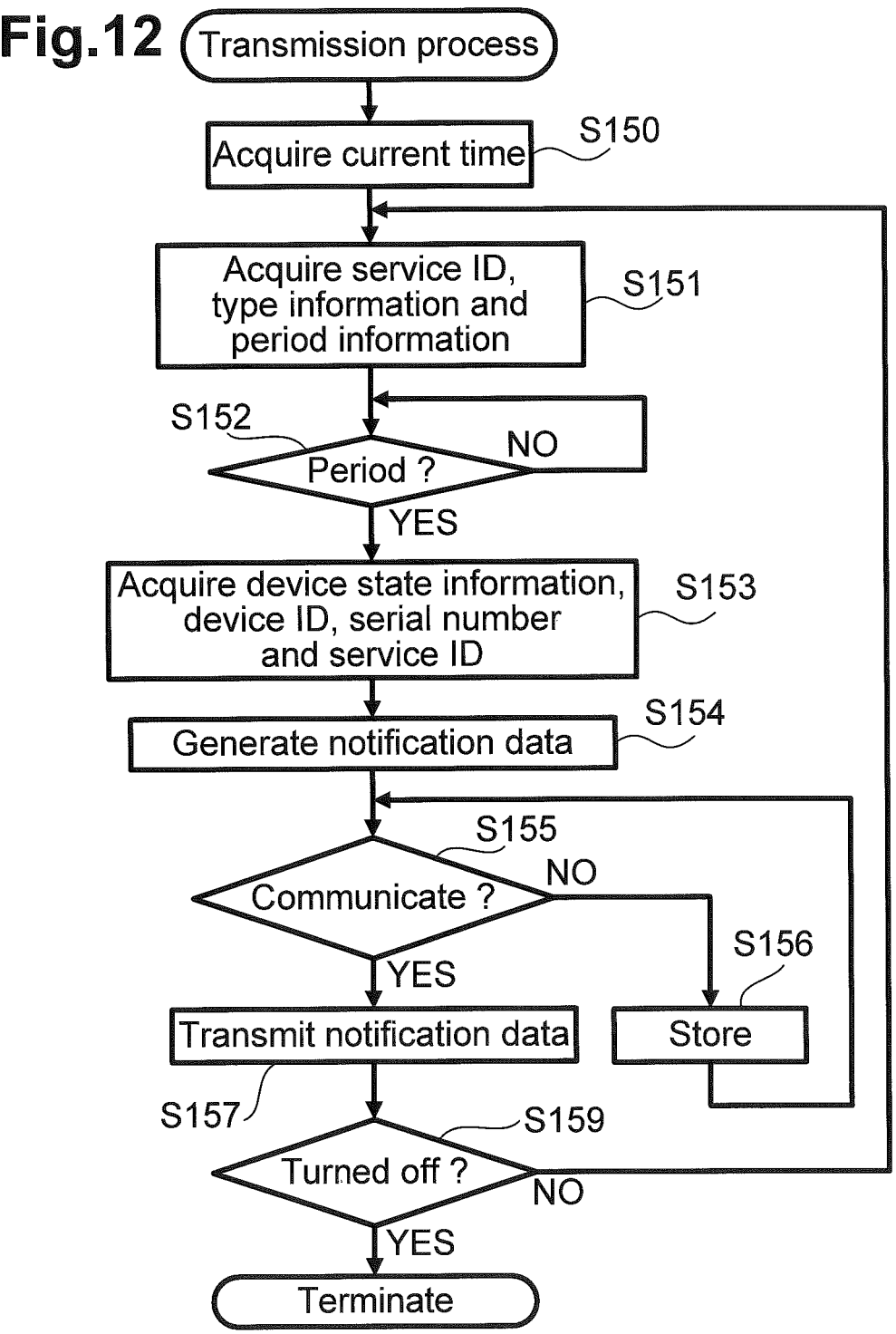

US 9,491,262 B2

NON-TRANSITORY COMPUTER READABLE MEDIUM, SERVER AND SYSTEM

CROSS-REFERENCE TO RELATED APPLICATION

This application claims priority from Japanese Patent Application No. 2013-053750, filed on Mar. 15, 2013, which is incorporated herein by reference in its entirety.

TECHNICAL FIELD

Aspects of the disclosure relate to a server and a network system that acquire information, which is stored in an information device, from the information device by communicating with a plurality of information devices, such as an image forming device.

BACKGROUND

A server and a network system for acquiring information, which is stored in an information device, from the information device by communicating with a plurality of information devices such as an image forming device are known. For example, a system such that a service center acquires information related to a state of a consumable supply of goods in an image forming device from the image forming device is known. In the known system, the information device transmits, to the service center, an order request message including type information for identifying a consumable supply of goods and notification identification information for identifying an order source. The order request message is for ordering a consumable supply of goods. The service center executes a procedure for delivering the consumer goods based on the received type information and notification identification information.

SUMMARY

The conventional network system can set each notification condition corresponding to each type of image forming device at the image forming apparatus. Accordingly, when a plurality of the service centers wants to receive information from the image forming apparatus, each of the plurality of the service centers cannot set different notification conditions at the image forming apparatus.

Aspects of the disclosure provide for a server and a system that are configured to make it easier to register the plurality of the authentication information on each of the plurality of the information devices.

Aspects described herein may provide a non-transitory computer-readable medium storing computer-readable instructions that, when executed by at least one processor of a server, cause the server to receive, from one of a plurality of service providing apparatuses, first information. The first information may include service identification information for identifying a service providing apparatus, device identification information for identifying one of a plurality of information devices, type information identifying one or more types of device state information representing one or more states of an information device, and a transmission condition representing a condition that causes an information device to transmit device state information. The computer-readable instructions may cause the processor to store the device identification, the type information, and/or the transmission condition in association with the service identification information, in a memory of the server. The computer-readable instructions may cause the processor to transmit, to one or more of information devices identified by device identification information, the type information and the transmission condition stored in association with the device identification information. The computer-readable instructions may cause the processor to receive, from the one or more information devices, device state information related to type information transmitted to the one or more information devices. The computer-readable instructions may cause the processor to store, in memory, the device state information in association with device identification information. The computer-readable instructions may cause the processor to transmit, to a specific service providing apparatus, identified by specific service identification information stored in memory, the device state information stored in association with the specific service identification information.

According to other aspects a server may be provided. The server may comprise at least one processor, and a memory. The memory may store computer-readable instructions therein that, when executed by the at least one processor, cause the server to receive, from one of a plurality of service providing apparatuses, service identification information for identifying the service providing apparatus. The server may also receive device identification information for identifying a plurality of information devices, type information identifying one or more of types of device state information representing one or more states that an information device may be in, and a transmission condition representing a condition for causing the information device to transmit the device state information. The computer-readable instructions may cause the server to store the device identification, the type information, and the transmission condition in association with the service identification information in the memory. The computer-readable instructions may cause the server to transmit, to one or more of specific information devices identified by device identification information, type information and transmission condition information. The computer-readable instructions may cause the server to receive, from the one or more of specific information devices, the device state information representing one or more sates related to the type information. The computer-readable instructions may cause the server to store, in the memory, the device state information in association with the device identification information identifying the one or more specific information devices. The computer-readable instructions may cause the server to transmit, to a specific service providing apparatus identified by specific service identification information, the device state information associated with the specific service identification information in the memory.

According to still other aspects a system may be provided. The system may comprise a server and an information device. The system may also comprise additional information devices and/or one or more service providing apparatuses. The server may comprise at least one first processor and a first memory. The first memory may store first computer-readable instructions therein that, when executed by the first processor(s), cause the server to receive, from a service providing apparatus, first information. The first information may include service identification information for identifying the service providing apparatus, device identification information for identifying an information device, type information identifying a type of device state information representing a state of the information device, and a transmission condition representing a condition that causes the information device to transmit the device state information. The first computer-readable instructions may cause the server to store the device identification, the type information, and the transmission condition in association with the service identification information, in a memory (e.g., the first memory). The first computer-readable instructions may cause the server to transmit, to the information device identified by the device identification information, the type information and the transmission condition. The information device may comprise at least one second processor and a second memory. The second memory may store second computer-readable instructions therein that, when executed by the second processor(s), cause the information device to receive the type information and the transmission condition from the server. The second computer-readable instructions may cause the information device to store the received type information and the received transmission condition in a memory (e.g., the second memory). The second computer-readable instructions may cause the information device to transmit, to the server, the device state information related to the stored type information in response to determining that the transmission condition stored in the second memory is satisfied. The first computer-readable instructions may cause the server to receive, from the information device, the device state information. The first computer-readable instructions may cause the server to store, in a memory (e.g., the first memory), the received device state information in association with the device identification information identifying the information device. The first computer-readable instructions may cause the server to transmit, to the service providing apparatus, the device state information received from the information device.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

BRIEF DESCRIPTION OF THE DRAWINGS

Aspects of the disclosure are illustrated by way of example and not by limitation in the accompanying figures in which like reference characters indicate similar elements.

FIG. 3 is an example of a table 241 according to one or more aspects of the disclosure.

FIG. 12 is a flowchart depicting an example of a transmission process according to one or more aspects of the disclosure.

DETAILED DESCRIPTION OF EXAMPLE EMBODIMENTS

Figure 1:
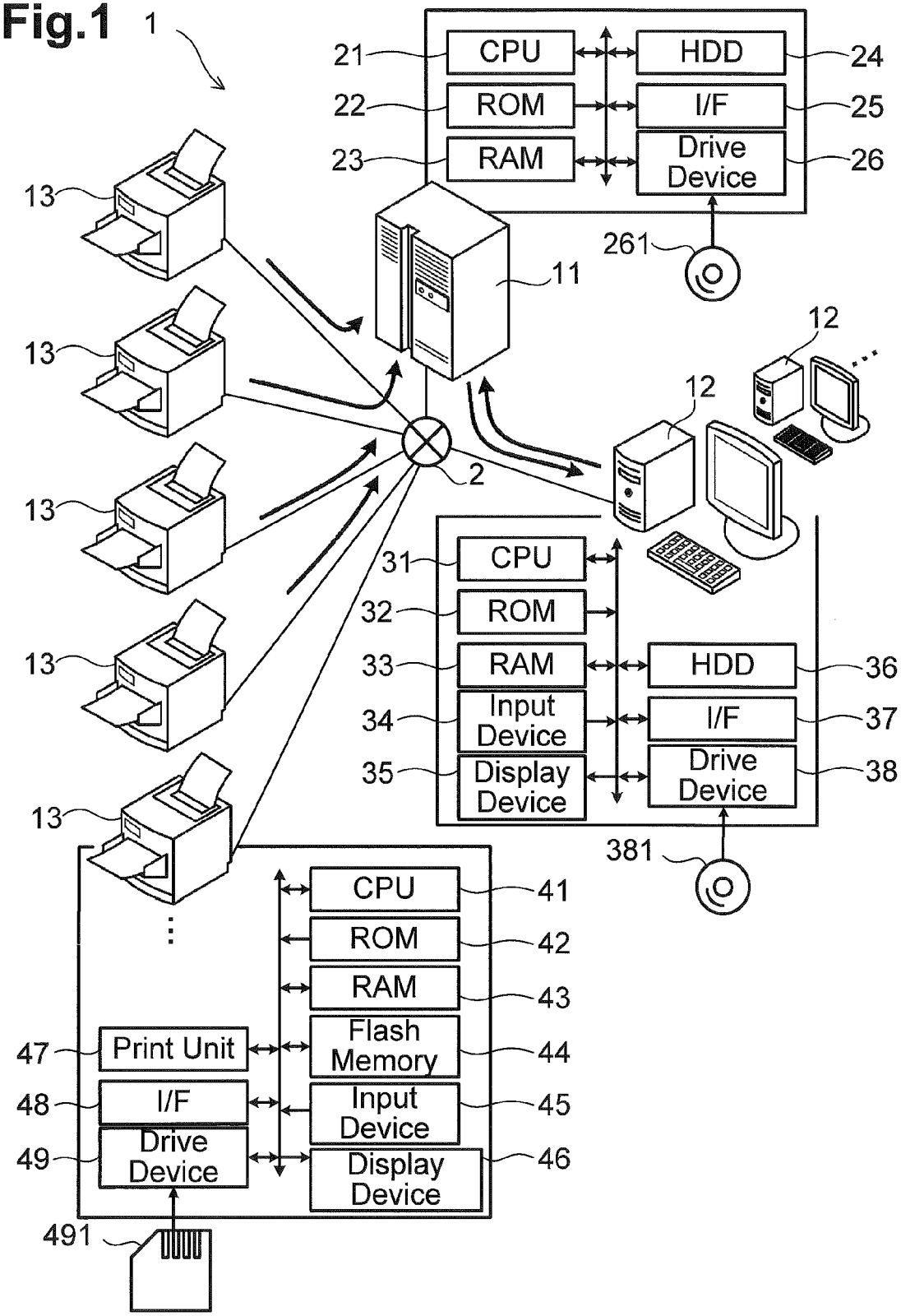
FIG. 1 depicts an example of a configuration of a network system 1 and a block diagram depicting an example electrical configuration of a server 11, information processing apparatus 12, and information device 13 according to one or more aspects of the disclosure.

For a more complete understanding of the present disclosure, needs satisfied thereby, and the objects, features, and advantages thereof, reference now is made to the following descriptions taken in connection with the accompanying drawing. Hereinafter, illustrative embodiments will be described in detail with reference to the accompanying drawings. The drawings will be referred to in order to explain technical features that may be adopted by the aspects of the disclosure. Configurations of devices and flowcharts of various processes depicted in the drawings do not limit the aspects of the disclosure, but merely illustrate the aspects of the disclosure. Additionally, U.S. patent application Ser. No. 14/209,111, entitled "Non-TRANSITORY COMPUTER READABLE MEDIUM, SERVER, AND SYSTEM" in the offices of Banner & Witcoff, Ltd., is hereby incorporated by reference herein in its entirety.

With reference to FIG. 1, a configuration of a network system 1 will be described. The network system 1 comprises a server 11, a plurality of information processing apparatuses 12, and a plurality of information devices 13. The server 11, the plurality of the information processing apparatuses 12, and the plurality of the information devices 13 can communicate with each other via a network 2. The server 11 is, for example, a Web server. The information processing apparatus 12 is, for example, a Web server. The information device 13 is, for example, a printer configured to print an image on a printing medium. The network 2 is, for example, an Internet. The server 11 receives, from each of the plurality of the information device 13, information which is stored in each of the plurality of the information devices 13.

The information which is stored in the information device 13 is, for example, device state information. The device state information may represent a state of the information device 13. For example, the device state information may represent an amount of printing (e.g., the number of characters, words, sheets, etc. printed) performed by the information device 13. For example, the device state information may represent a state of a consumable supply of consumer goods (e.g., ink, toner, paper, etc.) of the information device 13. For example, the device state information may represent a degree to which the consumable supply of consumer goods of the information device 13 is consumed. When the information device 13 is a printer configured to print an image by using ink, the device state information may include a value representing an amount of ink detected by a sensor configured to detect a remaining amount of ink. When the information device 13 is a printer configured to print an image by using toner, the device state information may include a value representing an amount of toner detected by a sensor configured to detect a remaining amount of toner. When the information device 13 is an image scanning device or a printer configured to scan data from a sheet, the device state information may represent the number of times a roller of the information device 13 has rotated to convey a printing medium (e.g., a sheet of paper). The device state information may represent any other state of the information device 13, such as a state of the printer or the image scanning device. The information device 13, for example, may be a sewing machine configured to sew an image by using a thread. The information device 13, for example, may be a scanner device configured to scan data from a sheet, or a capturing device (e.g., a camera) configured to capture data (e.g., image data).

The sever 11 is not limited to the Web server. The sever 11 may be a general PC (Personal computer), or a general server. The information processing apparatus 12 is not limited to the Web server. The information processing apparatus 12 may be a general PC (Personal computer), or a general server. The information device 13 is not limited to the printer. For example, the information device 13 may be any one of a copy machine, a facsimile machine, a scanner, a printer, and a multi-function peripheral configured to execute one or more of functions, for example, a print function, copy function, facsimile function, and scan function. In this embodiment, a terminal device which is not shown in FIG. 1 accesses the server 11 or the information processing apparatus 12 via the network 2. The terminal device may be a general computer. The terminal device may be also a mobile device (e.g., Personal Digital Assistant ("PDA"), smart phone, tablet computer, etc.).

The terminal device can use a service provided from the information processing apparatus 12, by accessing the information processing apparatus 12. More specifically, first, the server 11 may receive a plurality of the device state information from each of the plurality of the information devices 13 configured to connect to the sever 11 via the network 2. And then, the server 11 transmits, to the information processing apparatus 12, a plurality of the received device state information from the information device 13. When the information processing apparatus 12 receives the plurality of the device state information from the server 11, the information processing apparatus 12 makes the plurality of the device state information available for viewing by the terminal device. The server 11 may transmit, to a plurality of the information processing apparatuses 12, a plurality of the received device state information from the information device 13. In this case, each of the plurality of the information processing apparatuses 12 executes a procedure for the service. Alternatively, a single information processing apparatus 12 can execute a plurality of services. Each of the plurality of the services can provide one or more of the device state information to a user. The information processing apparatus 12 is therefore an example of a service providing apparatus.

With reference to FIG. 1, an electrical configuration of the server 11 will be described. The sever 11 comprises a central processing unit ("CPU") 21, a read-only memory ("ROM") 22, a random-access memory ("RAM") 23, a hard disk drive ("HDD") 24, a communication interface ("I/F") 25, and a drive device 26. The CPU 21, the ROM 22, the RAM 23, and the HDD 24, the communication I/F 25, and the drive device 26 may be electrically connected to each other. The CPU 21 may control the server 11. The CPU 21 may be a general processor or a specially configured processor. The ROM 22 is configured to store various programs, for example, a boot program, an operating system ("OS"), and a basic input output system ("BIOS"), for operating the server 11, and various initial setting values. The RAM 12 is configured to temporarily store various information to be used by a program, such as information related to a timer and/or a counter.

The HDD 24 may be a storage device and may be configured to store one or more programs for allowing the CPU 21 to execute a first process (see from FIG. 4 to FIG. 9). The HDD 24 may be configured to store a table 241 (see FIG. 3). The communication I/F 25 may be configured to allow the server 11 to connect to the network 2. The drive device 26 may be configured to read information from a storage medium 261. For example, the drive device 26 may read the program stored in the storage medium 261 and the program may be stored in the HDD 24, when the server 11 starts to set up. In some instances, the program may be stored in a predetermined server. In this case, the program may be downloaded from the predetermined server and stored in the HDD 24 via the network 2. Instead of the HDD 24, the server 11 may comprise any one of a flash memory, a read-only memory, and a random-access memory. Instead of the HDD 24, the server 11 may comprise various memory. The server 11 may comprises a computer-readable medium, as the HDD 24. The server 11 may comprise a computer-readable storage medium, as the HDD 24. Herein, a computer-readable storage medium may refer to any structural device from which data may be read, and does not include a transitory transmission signal.

With reference to FIG. 1, an electrical configuration of the information processing apparatus 12 will be described. The information processing apparatus 12 comprises a central processing unit ("CPU") 31, a read-only memory ("ROM") 32, a random-access memory ("RAM") 33, an input device 34, a display device 35, a hard disk drive ("HDD") 36, a communication interface ("I/F") 37, and a drive device 38. The CPU 31, the ROM 32, the RAM 33, the input device 34, the display device 35, the HDD 36, the communication I/F 37, and the drive device 38 may be electrically connected to each other. The CPU 31 may control the information processing apparatus 12. The CPU 31 may be a general processor or a specially configured processor. The ROM 22 is configured to store various programs, for example, a boot program, an operating system ("OS"), and a basic input output system ("BIOS"), for operating the information processing apparatus 12, and various initial setting values. The RAM 12 is configured to temporarily store various information to be used by a program, such as information related to a timer and/or a counter. The information processing apparatus 12 may comprise the input device 34 and the display device 35. The input device 34, for example, may be a keyboard or mouse. The display device 35 may be any type of a display (e.g., LCD screen, touch-screen, etc.).

Figure 10:
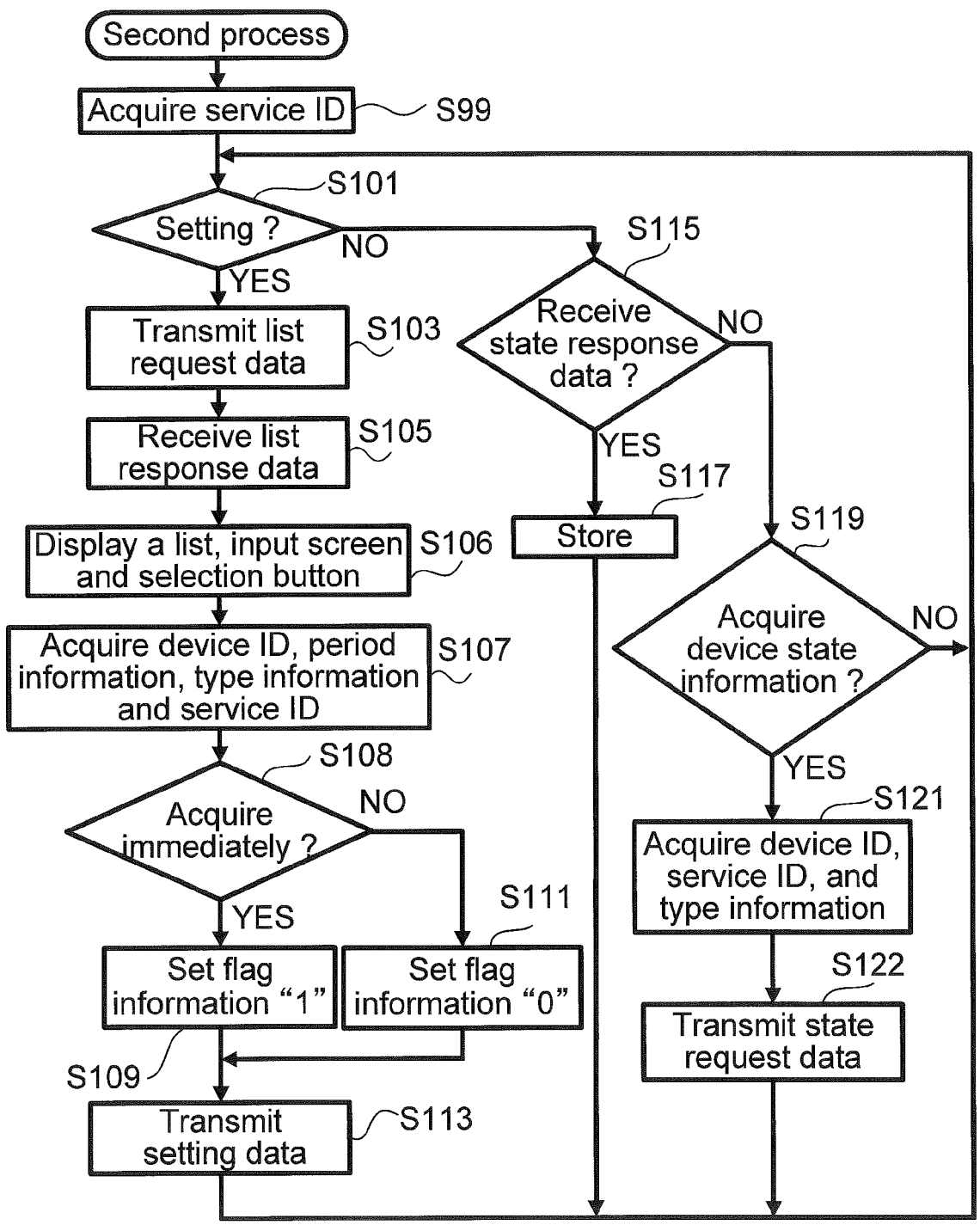
FIG. 10 is a flowchart depicting an example of a second process according to one or more aspects of the disclosure.

The HDD 36 may be a storage device and may be configured to store one or more programs for allowing the CPU 31 to execute a second process (see FIG. 10). The HDD 36 may store a service ID as described below. The HDD 36 may store information representing a type of the device state information which is provided to a user at each service. The HDD 36 may be configured to store an IP address of the server 11. The HDD 36 may be configured to store, as described below in detail, account information, number information representing the number of the information devices 13, period information, and flag information associated with each other.

The communication I/F 37 may be configured to allow the information processing apparatus 12 to connect to the network 2. The drive device 38 may be configured to read information from a storage medium 381. For example, the drive device 38 may read the program stored in the storage medium 381 and the program may be stored in the HDD 36, when the information processing apparatus 12 starts to set up. In some instances, the program may be stored in a predetermined server. In this case, the program may be downloaded from the predetermined server and stored in the HDD 36 via the network 2. Instead of the HDD 36, the information processing apparatus 12 may comprise any one of a flash memory, a read-only memory, and a random-access memory. Instead of the HDD 36, the information processing apparatus 12 may comprise various memory. The information processing apparatus 12 may comprises a computer-readable medium, as the HDD 36. The information processing apparatus 12 may comprise a computer-readable storage medium, as the HDD 36.

With reference to FIG. 1, an electrical configuration of the information device 13 will be described. The information device 13 comprises a central processing unit ("CPU") 41, a read-only memory ("ROM") 42, a random-access memory ("RAM") 43, a flash memory 44, an input device 45, a display device 46, a print unit 47, a communication interface ("I/F") 48, and a drive device 49. The CPU 41, the ROM 42, the RAM 43, the flash memory 44, the input device 45, the display device 46, the print unit 47, the communication I/F 48, and the drive device 49 may be electrically connected to each other. The CPU 41 may control the information device 13. The CPU 41 may be a general processor or a specially configured processor. The ROM 42 is configured to store various programs, for example, boot program, a basic input output system ("BIOS") for operating the information device 13, and one or more programs for allowing the CPU 41 to execute a third process (see FIGS. 11 and 12). The RAM 43 may be a volatile memory element. When a power source of the information device 13 is turned off, information which is stored in the RAM 43 may be deleted. The RAM 43 is configured to temporarily store various information to be used by a program, such as information related to a timer and/or a counter. Alternatively, the RAM 43 may store the service ID, type information, and period information as described below. The flash memory 44 is configured to store a plurality of device state information. Whenever the device state information updates, the CPU 41 may store the updated device state information in the flash memory 44. The flash memory is configured to store an IP address of the server 11, and a token for communicating with the server 11. The input device 45 may be a touch panel or a push-button. The display device 46 may be a liquid crystal panel. The print unit 47 may be a print mechanism configured to print an image on a print medium. The communication I/F 48 may be configured to allow the information device 13 to connect to the network 2. The drive device 49 may be configured to read information from a storage medium 491.

The information processing apparatus 12 communicates with the server 11 by using the stored IP address of the server 11 in the HDD 36, and establishes a session between the server 11 and the information processing apparatus 12. The server 11 acquires an IP address of the information processing apparatus 12 and a service identification ("ID") from the information processing apparatus 12, and stores, in the HDD 24, the acquired IP address and the acquired service ID in association with each other, after the server 11 establishes the session.

The server 11 can communicate with the information processing apparatus 12 using the IP address identified by the service ID, because the server 11 can identify the IP address of the information processing apparatus 12 according to the service ID. The information device 13 may establish a session between the server 11 and the information device 13 by using the stored IP address and the stored token in the flash memory 44. The server 11 may acquire an IP address of the information device 13 and device identification ("ID") from the information device 13, after the information device 13 establishes the session between the server 11 and the information device 13. The information device 13 may store, in the HDD 24, the acquired IP address and the acquired device ID in association with each other. The server 11 can communicate with the information device 13 using the IP address identified by the device ID, because the server 11 can identify the IP address of the information device 13 according to the device ID.

The information processing apparatus 12 may be assigned to the service ID which identifies the information processing apparatus 12. This service ID may be used so that the information apparatus 12 may acquire the appropriate device state information. The server 11 receives the device state information from the information device 13 identified by the service ID, according to a request from the information processing apparatus 12. The server 11 may transmit, to the information processing apparatus 12, the device state information which may be received from the information device 13. The information processing apparatus 12 may receive the device state information which may be transmitted from the server 11. Then, the terminal device can display the device state information, acquired by the information processing apparatus 12, via a browser of the terminal device, when the terminal device accesses the information processing apparatus 12.

Figure 2:
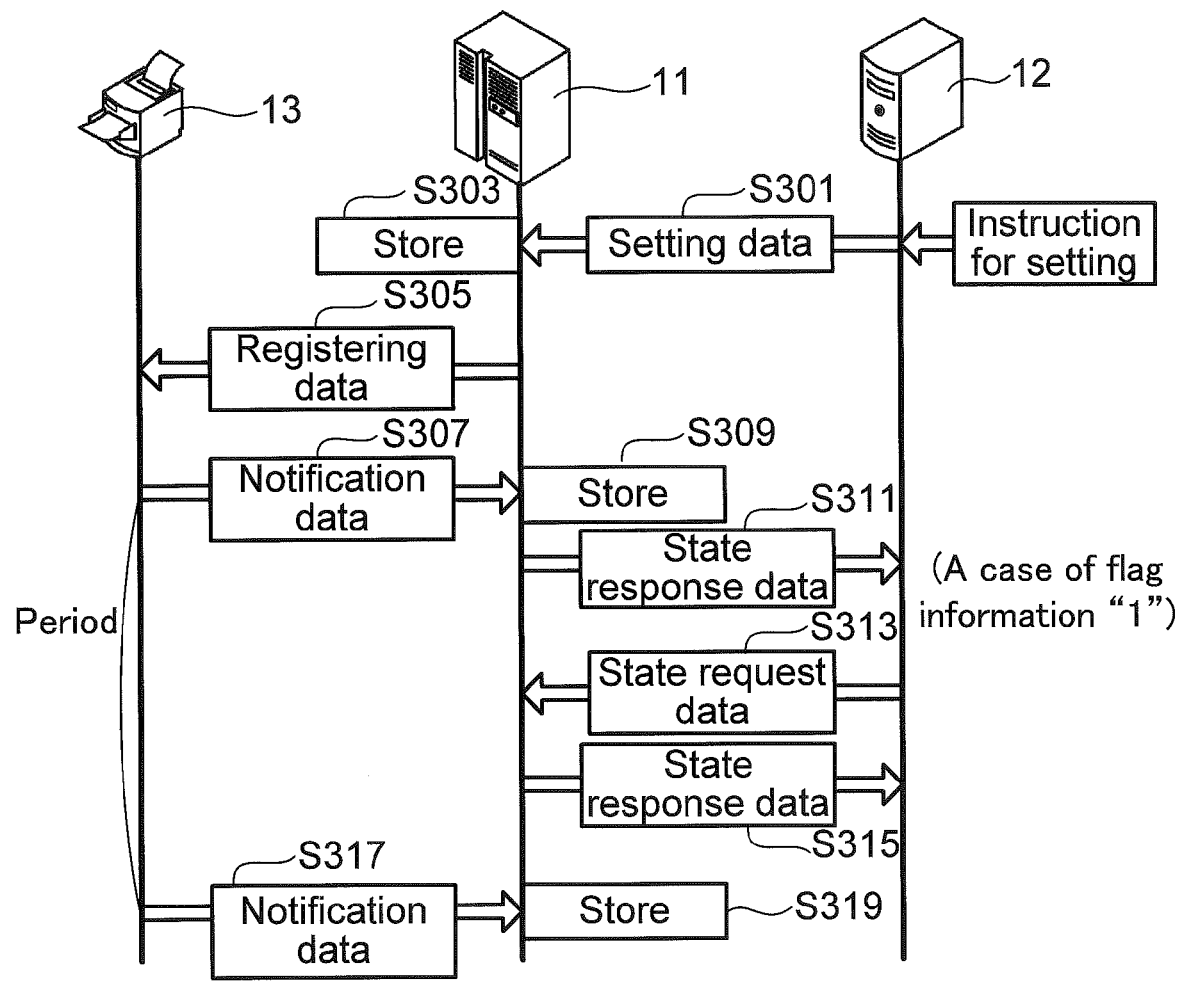
FIG. 2 is a diagram depicting an example of a communication sequence according to one or more aspects of the disclosure.

With reference to FIG. 2, the embodiment will be described in detail. Each of the plurality of the information processing apparatus 12 may acquire one or more of types of the device state information which are different from each of the plurality of the information processing apparatus 12. Therefore, each of the plurality of the information processing apparatus 12 sets, at the information device 13 via the server 11, one or more types of the device state information which are different from each of the plurality of the service IDs which is assigned to each of the information processing apparatus 12 (S301, S303, and S305). Alternatively, a timing when the server 11 acquires the device state information from the information device 13 may be different for each of service. Therefore, each of the plurality of the information processing apparatus 12 may set, at the information device 13 via the server 11, the timing (e.g., period or cycle) (S301, S303, and S305).

The information device 13 may store information representing the period or cycle, and information representing one or more types of the device state information in the RAM 43. Hereinafter, the information representing one or more types of the device state information is referred as "type information". Hereinafter, the information representing the period or cycle is referred to as "period information". The period information is an example of a "transmission condition" for causing the information device 13 to transmit the device state information. The information device 13 transmits, to the server 11 according to the period information, the device state information represented by the type information stored in the RAM 43, (S307 or S317). More specifically, the information device 13 transmits, to the server 11 at the period represented by the period information, the device state information represented by the type information stored in the RAM 43. The server 11 receives, from the information device 13, the device state information transmitted from the information device 13, and stores the received device state information in the HDD 26 (step S309 or step S319). The information processing apparatus 12 requests the server 11 for acquiring the device state information which is stored in the HDD 24 (step S313), after that, the information processing apparatus 12 can receive the device state information from the server 11 (step S315). Alternatively, at step S311, the information processing apparatus 12 may receive the device state information from the server 11 at a timing when the server 11 receives the device state information from the information device 13.

An information processing apparatus 12 may be provided for each of the plurality of services. More specifically, a number of information processing apparatuses 12 may match a number of the plurality of services. In this embodiment, for example, each of the information processing apparatuses 12 stores, in the HDD 36, the service ID corresponding to each of the information processing apparatus 12. The service ID for identifying each information processing apparatus 12 is information for identifying each service. Alternatively, one information processing apparatus 12 may correspond to the plurality of the services. In this case, the HDD 36 of the information processing apparatus 12 may store a plurality of the service IDs.

With reference to FIG. 3, the table 241 will be described. The service ID, the device ID, serial number, the type information, the device state information, the period information, and the flag information are stored in the table 241 in association with each other. Alternatively, in FIG. 3, a device ID may be stored in the table 241 in association with multiple service IDs. This indicates that a single information device 13 may be allowed to use the plurality of services.

The device ID is unique identification information for identifying the information device 13. The device ID, for example, may be stored in the ROM 42 by a manufacture in a manufacturing process of the information device 13. For example, the device ID may be a MAC address of the information device 13. The serial number may be a unique number (which may be sequentially assigned) for identifying each of the plurality of the information devices 13. The serial number, for example, may be stored in the flash memory 44 by a manufacture of the information device 13. The flag information represents whether the server 11 transmits the received device state information to the information processing apparatus 12 at a timing when the server 11 receives the device state information from the information device 13 or not. The flag information "1" represents that the server 11 transmits the received device state information to the information processing apparatus 12 at a timing when the server 11 receives the device state information from the information device 13. The flag information "0" represents that the server 11 does not transmit the received device state information to the information processing apparatus 12 at a timing when the server 11 receives the device state information from the information device 13. The flag information is an example of "setting information".

When the server 11 receives setting data, the server 11 stores, in the table 241, information included in the received setting data. The service ID, the device ID, the type information, the period information, and the flag information are included in the setting data which is transmitted from the information processing apparatus 12 at step S301 in FIG. 2. For example, the device ID, the period information, and the flag information may be inputted into a terminal device which is allowed access to the information processing apparatus 12, and the terminal device may transmit, to the information processing apparatus 12, the inputted device ID, the period information, and the flag information. The serial number and the device state information are included in notification data which is transmitted from the information device 13 at step S307 or step S311 in FIG. 2. The server 11 stores, in the table 241, information included in the received notification data.

With reference to FIGS. 4-9, the first process executed by the CPU 21 of the server 11 will be described. The CPU 21 reads the program from the HDD 24 and executes the first process, for example, when the server 11 is turned on.

Figure 4:
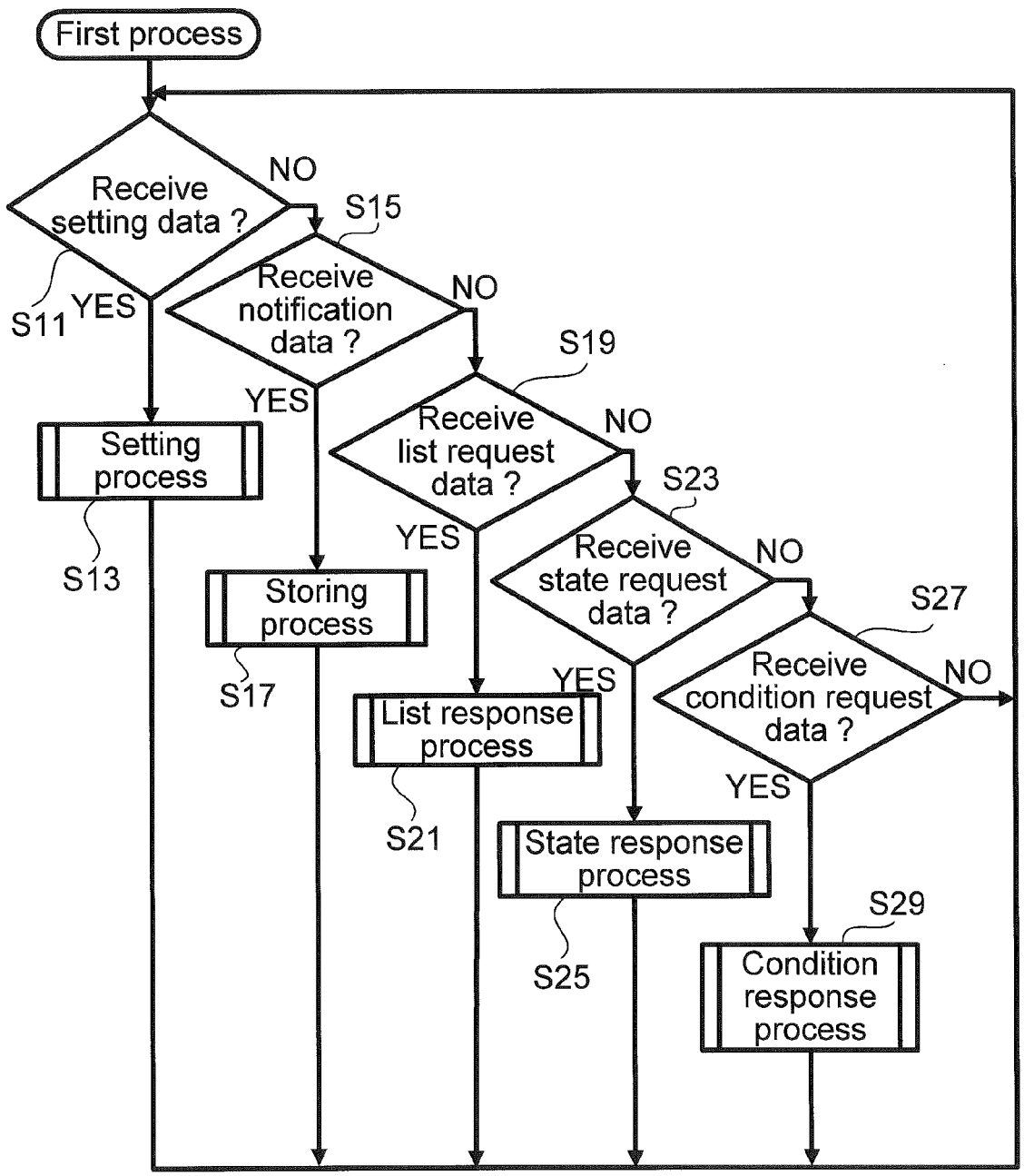
FIG. 4 is a flowchart depicting an example of a first process according to one or more aspects of the disclosure.
Figure 5:
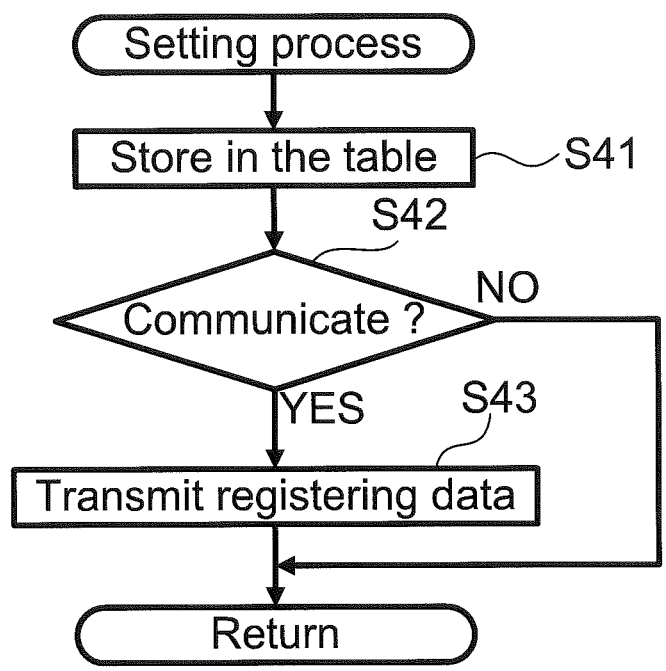
FIG. 5 is a flowchart depicting an example of a setting process according to one or more aspects of the disclosure.

As depicted in FIG. 4, the CPU 12 determines whether the setting data which is transmitted from the information processing apparatus 12 is received or not (step S11). The CPU 31 of the information processing apparatus 12 transmits the setting data to the server 11 by executing step S113 in FIG. 10. The setting data includes the service ID, device ID, the type information, the period information, and the flag information. The CPU 21 executes a setting process as depicted in FIG. 5 (step S13), when the CPU 21 determines that the setting data is received (step S11: YES).

With reference to FIG. 5, the setting process will be described. The CPU 21 stores, in the table 241, the service ID, the device ID, the type information, the period information, and the flag information, which are included in the received setting data, associated with each other (step S41). The CPU 21 determines whether the server 11 can communicate with the information device 13 identified by the stored device ID at step S41 or not (S42). For example, the CPU 21 transmits a ping signal (e.g., a PING signal in IP/TCP) to the information device 13. The CPU 21 determines whether the server 11 can communicate with the information device 13 or not by determining whether a response of the PING is received from the information device 13 or not. The CPU 21 determines that the server 11 is not communicating with the information device 13, when the CPU 21 determines that the response of the PING is not received from the information device 13 (step S42: NO). The CPU 21 executes step S11 of FIG. 4 again, when the CPU 21 determines that the server 11 is not communicating with the information device 13 (step S42: NO). The CPU 21 may execute step S42 again, when the CPU 21 determines that the server 11 is not communicating with the information device 13 (step S42: NO). The CPU 21 may repeat execution of step S42 until the CPU 21 determines that the server 11 is communicating with the information device 13 (step S42: YES) or attempts to communicate a predetermined number of times (e.g., 1, 2, 5, 10, etc.).

The CPU 21 determines that the server 11 can communicate with the information device 13 (step S42: YES), when the CPU 21 determines that the response of the PING is received from the information device. The CPU 21 transmits, to the information device 13 which the server 11 can communicate with, registering data including the service ID, the type information, and the period information which are stored in the table 241 at step S41 (step S43). After that the CPU 21 executes step S11 of FIG. 4 again.

Figure 6:
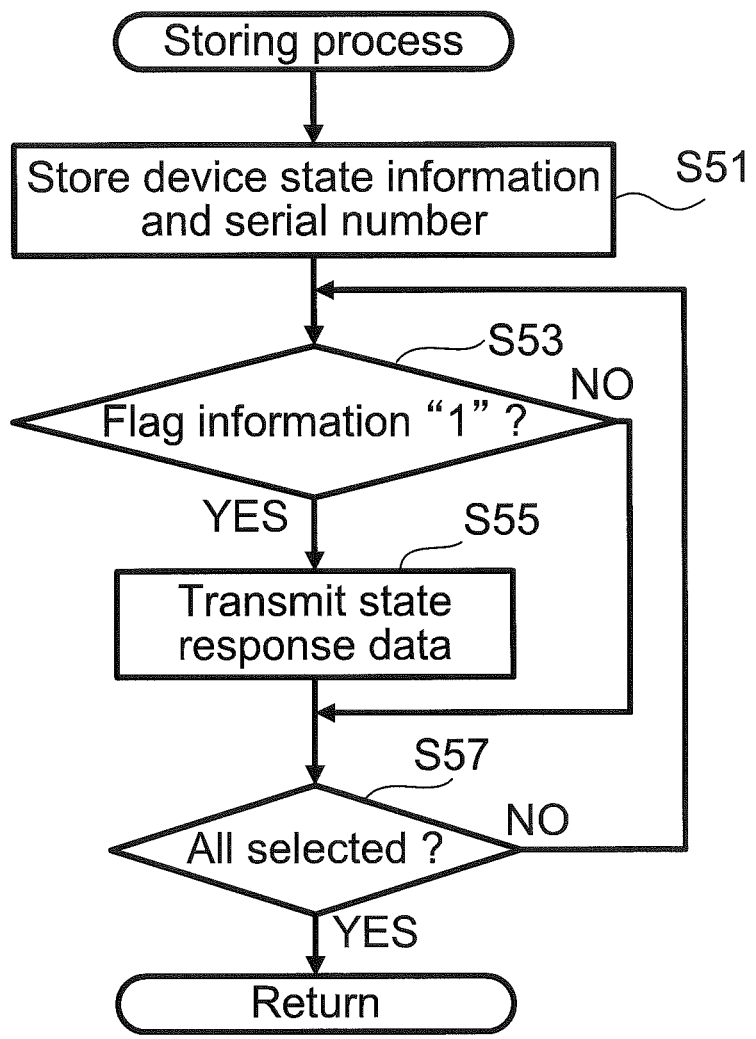
FIG. 6 is a flowchart depicting an example of a storing process according to one or more aspects of the disclosure.
Figure 11:
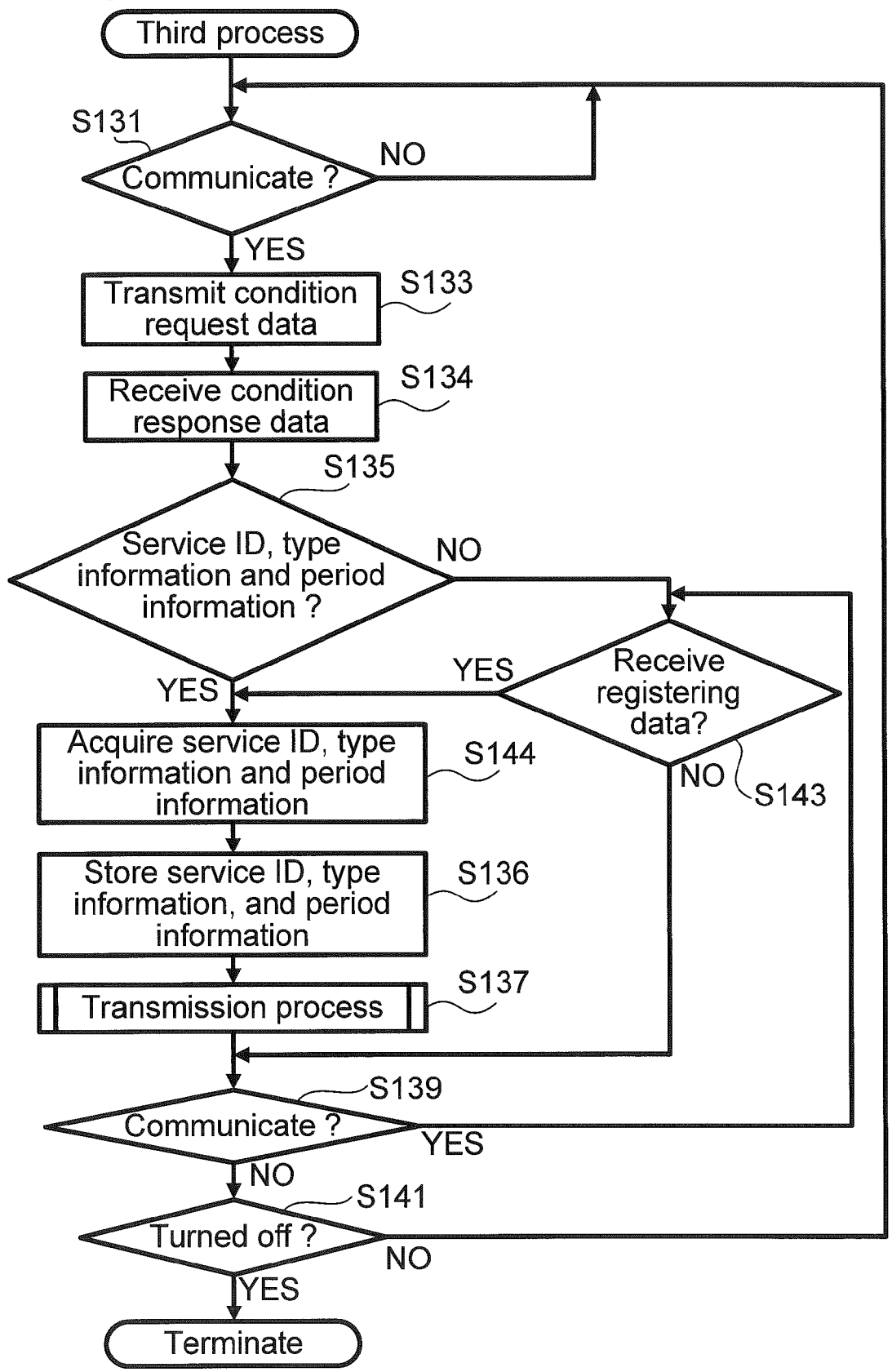
FIG. 11 is a flowchart depicting an example of as third process according to one or more aspects of the disclosure.

The transmitted registering data is received by the information device 13 at step S143 of FIG. 11. By executing step S157 of FIG. 12, the server 11 can transmit, to the server 11 at the period represented by the period information, the notification data including the device state information corresponding to the type information included in the registering data, based on the received registering data. The notification data includes the service ID, the device ID, and the serial number in addition to the device state information. Alternatively, the notification data may not include the serial number. The CPU 21 executes a storing process as depicted in FIG. 6 (step S17), when the CPU 21 determines that the notification data is received (step S15: YES).

With reference to FIG. 6, the storing process will be described. The CPU 21 stores, in the table 241, the device state information and the serial number included in the notification data, associated with the device ID included in the received notification data at step S15 (step S51). Alternatively, the CPU 21 may store, in the table 241, the device information and the serial number included in the notification data in association with the device ID which corresponds to each of the plurality of the service IDs, when the device ID is associated with a plurality of the service IDs.

The CPU 21 selects, from the table 241, the service ID corresponding to the device ID included in the received notification data at step S15. The CPU 21 determines whether the flag information associated with the selected service ID is "1" or not (step S53). The CPU 21 executes step S57, when the CPU 21 determines that the flag information associated with the selected service ID is not "1" (step S53: NO), that is, when the CPU 21 determines that the flag information is "0". The CPU 21 transmits, to the information processing apparatus 12 corresponding to the selected service ID, state response data including the device state information which is stored in the table 241 at step S51 (step S55), when the CPU 21 determines that the flag information associated with the selected service ID is "1" (step S53: YES). After that, the CPU 21 executes step S57.

The CPU 21 determines whether all of the service IDs corresponding to the device ID which is stored in the table 241 at step S51 are selected or not (step S57). The CPU 21 executes step S53 again, when the CPU 21 determines that one or more of the service IDs which have not been selected are stored in the table 241 (step S57: NO). The CPU 21 selects any one of the one or more of the service IDs which have not been selected, and executes step S53 and step S55 again. The CPU 21 executes step S11 of FIG. 4 again, when the CPU 21 determines that all of the service IDs corresponding to the device ID are selected (step S57: YES).

As described above, the CPU 21 may transmit the state response data to the information processing apparatus 12 immediately, when the CPU 21 receives the notification data from the information device 13 identified by the device ID associated with the flag information "1". For this reason, the information processing apparatus 12 can acquire the device state information included in the state response data immediately, because the information processing apparatus 12 can receive the state response data from the server 11 at a timing when the server 11 receives the state response data from the information device 13.

Alternatively, the CPU 21 may store, in the table 241, the device state information which is included in the notification data, associated with only the service ID and the device ID which are included in the notification data, when the CPU 21 receives the notification data from the information device 13. The CPU 21 may transmit the device state information included in the notification data to only the information processing apparatus 12 corresponding to the service ID included in the notification data.

As depicted in FIG. 4, the CPU 21 may determine whether a list request data which is transmitted from the information processing apparatus 12 is received or not (step S19), when CPU 21 determines that the notification data is not received (step S115: NO). The list request data is used when the information processing apparatus 12 requests a list of the device ID and the serial number associated with the service ID in the table 241. The list request data may include the service ID. Alternatively, the list request data may include the account information. The account information may be set by each user of the information device 13 which is managed by the server 11. More specifically, a plurality of the device IDs associated with one account information are stored in the HDD 24, when the user manages a plurality of the information devices 13. On the other hand, one device ID associated with one account information is stored in the HDD 24, when the user manages one information device 13. In this case, the list request data may be used when the information processing apparatus 12 requests a list of the device IDs and the serial numbers associated with the account information in the table 241. Then the information processing apparatus 12 stores the account information, the device ID and the serial number associated with each other in the HDD 36. The CPU 21 executes a list response process (step S21) in FIG. 7, when the CPU 21 determines that the list request data is received (step S19: YES).

Figure 7:
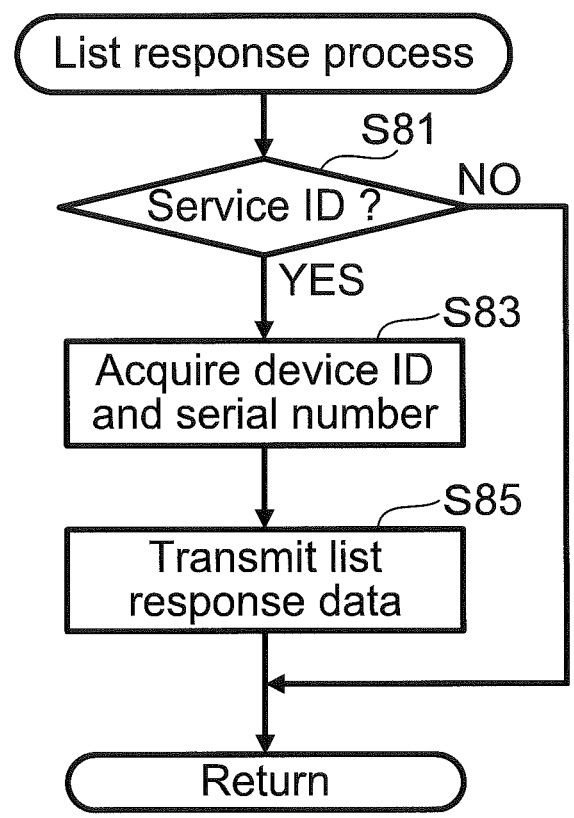
FIG. 7 is a flowchart depicting an example of a list response process according to one or more aspects of the disclosure.

With reference to FIG. 7, the list response process will be described. The CPU 21 may determine whether the service ID is included in the received list request data or not (step S81). The CPU 21 may execute step S11 of FIG. 4 again, when the CPU 21 determines that the service ID is not included in the received list request data (step S81: NO). The CPU 21 may acquire, from the table 241, the device ID and the serial number associated with the service ID included in the list request data (step S83), when the CPU 21 determines that the service ID is included in the list request data (step S81: YES). The CPU 21 may transmit, to the information processing apparatus 12 which transmits the list request data, the list response data including the device ID and the serial number (step S85). The CPU 21 may execute step S11 of FIG. 4 again.

Figure 8:
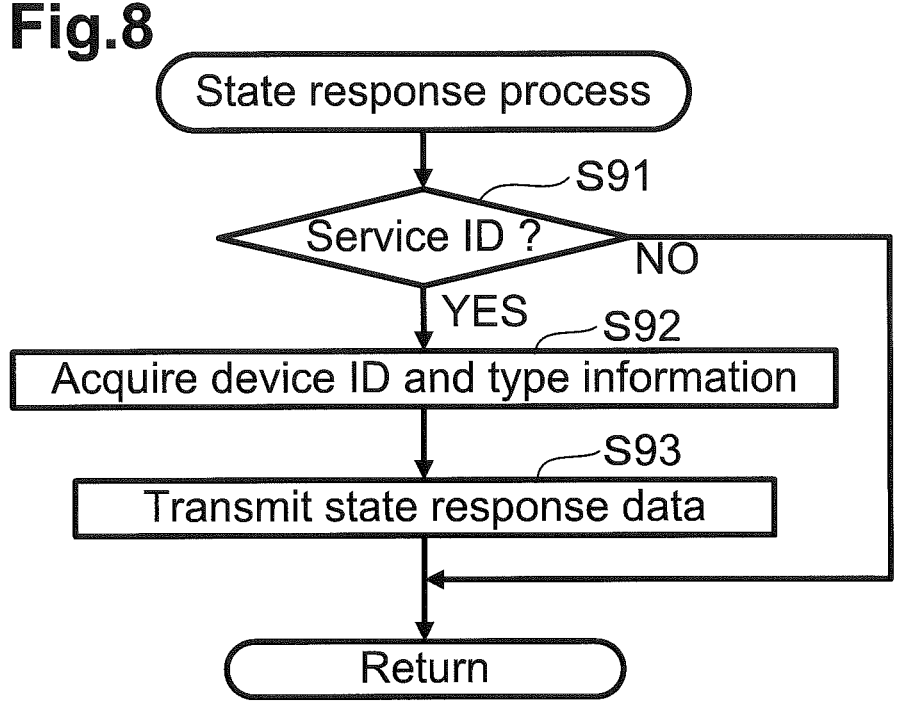
FIG. 8 is a flowchart depicting an example of a state response process according to one or more aspects of the disclosure.

The CPU 21 may determine whether state request data which is transmitted from the information processing apparatus 12 is received or not (step S23), when the CPU 21 determines that the list request data is not received (step S19: NO). The state request data is used, when the information processing apparatus 12 requests to acquire the device state information from the table 241. The state request data may include the service ID, the device ID, and the type information. The CPU 21 may execute a state response process as depicted in FIG. 8 (step S25), when the CPU 21 determines that the state request data is received (step S23: YES).

With reference to FIG. 8, the state response process will be described. The CPU 21 may determine whether the service ID, the device ID, and the type information are included in the received state request data or not (step S91). The CPU 12 may execute step S11 of FIG. 4 again, when the CPU 21 determines that the service ID, the device ID, and the type information are not included in the state request data (step S91: NO).

The CPU 21 may acquire, from the table 241, the device state information associated with the service ID, the device ID, and the type information which are included in the state request data (step S92), when the CPU 21 determines that the service ID, the device ID, and the type information are included in the state request data (step S91: YES). The CPU 21 may transmit, to the information processing apparatus 12 which transmits the state request data, the state response data including the acquired device state information and the device ID (step S93). That is, the CPU 21 may transmit the state response data to the information processing apparatus 12 identified by the service ID (step S93). Then the CPU 21 may execute step S11 of FIG. 4 again.

Figure 9:
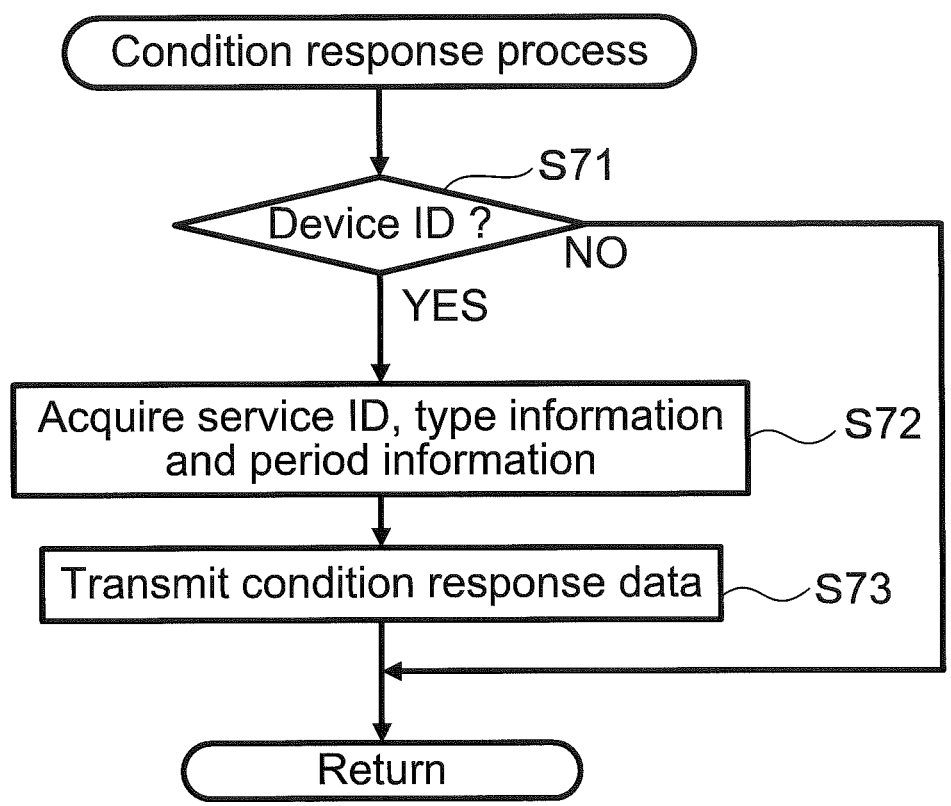
FIG. 9 is a flowchart depicting an example of a condition response process according to one or more aspects of the disclosure.

The CPU 21 may determine whether condition request data which is transmitted from the information device 13 is received or not (step S27), when the CPU 21 determines that the state request data is not received (step S23: NO). The condition request data may be used, when the information device 13 requests to acquire the type information and the period information from the table 241. The condition request may include the device ID. The CPU 21 may execute step S11 again, when the CPU 21 determines that the condition request data is not received (step S27: NO). The CPU 21 may execute a condition response process as depicted in FIG. 9 (step S29), when the CPU 21 determines that the condition request data is received (step S27: YES).

With reference to FIG. 9, the condition response process will be described. The CPU 21 may determine whether the device ID is included in the received condition request data or not (step S71). The CPU 21 may execute step S11 of FIG. 4 again, when the CPU 21 determines that the device ID is not included in the received condition request data (step S71: NO).

The CPU 21 may acquire, from the table 241, the service ID, the type information, and the period information associated with the device ID included in the condition request data (step S72), when the CPU 21 determines that the device ID is included in the received condition request data (step S71: YES). Alternatively, the CPU 21 may acquire, from the table 241, the service ID, the type information and the period information associated with a plurality of the device IDs, when the plurality of the device ID included in the condition request data and the plurality of the device ID are stored in the table 241. The CPU 21 may transmit, to the information device 13 identified by the device ID included in the condition request data, the condition response data including the acquired service ID, the acquired type information, and the acquired period information (step S73). The CPU 21 may execute step S11 of FIG. 4 again.

With reference to the flowchart of FIG. 10, the second process executed by the CPU 31 of the information processing apparatus 12 will be described. The CPU 31 may read a program from the HDD 36 and execute the second process, for example, when the information processing apparatus 12 is turned on. The program may be executed, whenever the information processing apparatus 12 is being tuned on.

The CPU 31 may acquire the service ID from the HDD 36 (step S99). The CPU 31 may determine whether a setting instruction is received from the terminal device or not (step S101). The setting instruction is an instruction for setting the type information and the period information at the information device 13. For example, the terminal device may transmit the setting instruction to the information processing apparatus 12 via the network 2. The CPU 31 may transmit, to the server 11, the list request data including the acquired service ID at step S99 (step S103), when the CPU 31 determines that the setting instruction is received from the terminal device (step S101: YES). The server 11 may transmit, to the information processing apparatus 12, the list response data including the device ID and the serial number at step S85 of FIG. 7, when the server 11 receives the list request data at step S19 of FIG. 4. The CPU 31 may receive the list response data which is transmitted from the server 11 (step S105).

The CPU 31, for example, cause a browser of the terminal device to display the device ID and the serial number included in the received list response data (step S106). More specifically, at step S106, the CPU 31 may generate a web page for displaying the device ID and the serial number included in the received list response data in the browser of the terminal device. The generated web page is acquired by the terminal device and the generated web page is displayed by the browser of the terminal device. The device ID or the serial number displayed in the browser represents the information device 13 at which the type information and the period information inputted into the terminal device is set. Therefore, a user of the terminal device can confirm the device ID and the serial number of the information device 13 at which the type information and the period information is set at the present time, by watching the browser of the terminal device.

At step S106, the CPU 31 may cause the browser of the terminal device to display a web page for inputting the device ID and the period information. More specifically, at step S106, the CPU 31 generates the web page for displaying, in the browser of the terminal device, an input screen configured to input the device ID and the period information. The generated web page is acquired by the terminal device and the generated web page is displayed by the browser of the terminal device. Furthermore, at step S106, the CPU 31 may cause the browser of the terminal device to display a web page including an option (e.g., a selection button) for selecting whether to acquire the device state information immediately or not. More specifically, at step S106, the CPU 31 generates the web page for displaying, in the browser of the terminal device, the selection button for selecting whether to acquire the device state information immediately or not. The generated web page may be acquired by the terminal device and the generated web page may be displayed by the browser of the terminal device. The user of the terminal device may input the device ID of the information device 13 for setting the type information and/or the period information into the terminal device. After that, the user of the terminal device may input the period information into the terminal device for setting the period information at the information device 13, and the user of the terminal device may input, into the terminal device, a selection result by using the selection button.

The CPU 31 may acquire, from the terminal device, the device ID, the period information, and the selection result (step S107). More specifically, the terminal device may transmit, to the information processing apparatus 12, the inputted device ID, the inputted period information, and the selection result, and, at step S107, the CPU 31 may acquire, from the terminal device, the device ID, the period information, and the selection result which are transmitted from the terminal device. At step S107, the CPU 31 further acquires, from the HDD 36, the type information identifying a type of the device state information which is stored in the HDD 36. At step S107, the CPU 31 may further acquire the service ID from the HDD 36. The CPU 31 may set the flag information at a first predetermined value (e.g., as "1") (step S109), when the CPU 31 determines that the selection result represents a desire to acquire the device state information immediately (step S108: YES). The CPU 31 may set the flag information at a second predetermined value (e.g., as "0") (step S111), when the CPU 31 determines that the selection result does not represent a desire to acquire the device state information immediately (step S108: NO).

At step S113, the CPU 31 may generate the setting data including the service ID, the device ID, the type information, and the period information which are acquired at step S107. The generated setting data may further include the flag information which is set at step S109 or step S110. At step S113, the CPU 31 may transmit the generated setting data to the server 11. After that, the CPU 31 may execute step S101 again.

As described above, the type information included in the setting data may be designated by the user of the terminal device. More specifically, the CPU 31 may generate a web page including a screen for designating the type information, and the terminal device may display the generated web page in the browser of the terminal device. The terminal device may transmit, to the information processing apparatus 12, the designated type information in the webpage displayed by the browser of the terminal device. The CPU 31 may receive the type information from the terminal device, and the CPU 31 may include the received type information in the setting data at step S113.

At step S11 of FIG. 4, the server 11 may receive, from the information processing apparatus 12, the setting data which is transmitted from the information processing apparatus 12 at the step S113. After that, at step S41 of FIG. 5, the server 11 may store, in the table 241, the service ID, the device ID, the type information, the period information, and the flag information which are included in the setting data. The server 11 may transmit the registering data to the information device 13 at step S43 of FIG. 5. The information device 13 may store, in the RAM 43, the service ID, the type information, and the period information which are included in the registering data at step S136 of FIG. 11, when the information device receives the registering data from the server 11 at step S143 of FIG. 11. The information device 13 may start to transmit the notification data to the server 11 intermittently or periodically at step S157 of FIG. 12. The server 11 may receive the notification data from the information device 13 at step S15 of FIG. 4. The server 11 may transmit the state response data to the information processing apparatus 12 at step S55 of FIG. 6, when the server 11 determines that, in the table 241, the flag information "1" is associated with the device ID of the information device which transmits the notification data at step S53 of FIG. 6.

The CPU 31 may determine whether the state response data is received from the server 11 or not (step S115). The CPU 31 may store, in the HDD 36, the device ID and the device state information, which are included in the received state response data, in association with each other (step S117), when the CPU 31 determines that the state response data is received from the server 11 (step S115: YES). The terminal device can acquire, from the information processing apparatus 12, the device state information stored in the information device 13. Then, the CPU 31 may execute step S101 again.

The CPU 31 may determine whether an instruction for acquiring the device state information which is stored in the server 11 is received or not (step S119), when the CPU 31 determines that the state response data is not received from the server 11 (step S115: NO). More specifically, at step S119, the CPU 31 may determine that the instruction for acquiring the device state information is received, when the CPU 31 receives a request of the device state information from the terminal device. At step S119, the CPU 31 may issue the instructions for acquiring device state information intermittently or periodically. In this case, the CPU 31 may determine that the instruction for acquiring the device state information is received, when the CPU 31 issues the instruction for acquiring the device state information. The CPU 31 may execute step S101 again, when the CPU 31 determines that the instruction for acquiring the device state information is not received (step S119: NO). The CPU 31 may acquire the device ID (step S121), when the CPU 31 determines that the instruction for acquiring the device state information is received (step S119: YES). For example, the CPU 31 may acquire the device ID which is acquired from the terminal device at step S107. The CPU 31 may also read the service ID from the HDD 36, and acquire the service ID (step S121). The CPU 31 may read, from the HDD 36, the type information identifying a type of the device state information which is provided to the terminal device by using the acquired service ID to acquire the type information (step S121). The CPU 31 may transmit, to the server 11, the state request data including the service ID, the device ID, and the type information (step S122). After that, the CPU 31 may execute step S101 again.

At step S23 of FIG. 4, the CPU 21 of the server 11 may receive, from the information processing apparatus 12, the state request data which is transmitted from the information processing apparatus 12 at step S122. The CPU 21 may transmit the state response data to the information processing apparatus 12 at step S93 of FIG. 8. The CPU 31 of the information processing apparatus 12 may store, in the HDD 36, the device ID, the device state information, and the type information which are included in the received state response data, associated with each other at step S115 of FIG. 10, when the CPU 31 of the information processing apparatus 12 determines that the state response data is received from the server 11 at step S115 of FIG. 10.

Alternatively, a timing of transmitting the state request data may be a predetermined timing (e.g., predetermined time (e.g., 18:00), or weekend (e.g., Friday), or end of month (e.g., on the 30$^{th}$ day of each month)).

With reference to the flowcharts of FIGS. 11 and 12, the third process executed by the CPU 41 of the information device 13 will be described. The CPU 41 may read a program from the flash memory 44 and execute the third process, for example, when the information device 13 is turned on. As described below, the CPU 41 may start to execute the transmission process at step S137 of the third process. When the CPU 41 starts to execute the transmission process, the CPU 41 may execute the third process and the transmission process in a parallel manner. Alternatively, when the information device 13 is turned off, information which is stored in the RAM 43 may be deleted. Therefore, even though the service ID, the type information, and the period information are stored in the RAM 43, when the information device 13 is turned off, the service ID, the type information, and the period information which are stored in the RAM 43 may be deleted.

As depicted in FIG. 11, the CPU 41 may determine whether the information device 13 can communicate with the server 11 or not (step S131). For example, the CPU 41 determines whether the information device 13 can communicate with the server 11 or not by determining whether a response of a ping signal (e.g., the PING) which is transmitted by the information device 13 is received from the server 11 or not. The CPU 41 may determine that the information device 13 cannot communicate with the server 11 (step S131: NO), when the CPU 41 does not receive, from the server 11, the response of the PING which is transmitted by the information device 13. The CPU 41 may execute step S131 repeatedly. The CPU 41 may execute step S131 repeatedly, until the CPU 41 determines that the information device 13 can communicate with the server 11.

The CPU 41 may determine that the information device 13 can communicate with the server 11 (step S131: YES), when the CPU 41 receives, from the server 11, the response of ping signal (e.g., the PING) which is transmitted by the information device 13. Then the CPU 41 may acquire the device ID from the ROM 42. The CPU 41 may transmit, to the server 11, the condition request data including the acquired device ID (step S133). The server 11 may transmit the condition response data to the information device 13 at step S73 of FIG. 9, when the server 11 receives the condition request data at step S27 of FIG. 4.

The CPU 41 may receive the condition response data from the server 11 (step S134). The CPU 41 may determine whether the service ID, the type information, and the period information are included in the received condition response data or not (step S135). The CPU 41 may acquire the service ID, the type information, and the period information which are included in the received condition response data (step S144), when the CPU 41 determines that the service ID, the type information, and the period information are included in the received condition response data (step S135: YES). The CPU 41 may store, in the RAM 43, the acquired service ID, the acquired type information, and the acquired period information in association with each other (step S136). Therefore, the CPU 41 can acquire the service ID, the type information, and the period information from the server 11, and store the acquired service ID, the acquired type information, and the acquired period information in the RAM 43 again, even though the information device 13 is turned off, and the service ID, the type information, and the period information which are stored in the RAM 43 are deleted.

The CPU 41 may execute the transmission process of FIG. 12, based on the service ID, the type information, and the period information which are stored in the RAM 43 (step S137). After that, the CPU 41 may execute step S139. A detail of the transmission process will be described below. The CPU 41 might not execute the transmission process at step S137, when the CPU 41 has already started to execute the transmission process.

The CPU 41 may determine whether the registering data is received from the server 11 or not (step S143), when the CPU 41 determines that the service ID, the type information, and the period information are not included in the received condition response data (step S135: NO). The CPU 41 may acquire the service ID, the type information, and the period information which are included in the received registering data (step S144), when the CPU 41 determines that the registering data is received (step S143: YES). After that, the CPU 41 may execute step S136. The CPU 41 may store, in the RAM 43, the acquired service ID, the type information, and the period information in association with each other (step S136). The CPU 41 may start to execute the transmission process as depicted in FIG. 12 (step S137). After that, the CPU 41 may execute step S139. Alternatively, the CPU 41 may execute step S139, when the CPU 41 determines that the registering data is not received (step S143: NO).

The CPU 41 may determine whether the information device 13 can communicate with the server 11 or not (step S139). A specific method for determining whether the information device 13 can communicate with the server 11 is the same as step S131. The CPU 41 may execute step S143 again, when the CPU 41 determines that the information device 13 can communicate with the server 11 (step S139: YES). The CPU 41 may execute step S141, when the CPU 41 determines that the information device cannot communicate with the server 11 (step S139: NO). After that the CPU 41 may determine whether the information device 13 is turned off or not (step S141). The CPU 41 may execute step S131 again, when the CPU 41 determines that the information device 13 is not turned off (step S141: NO). The third process terminates, when the CPU 41 determines that the information device 13 is turned off (step S141: YES).

With reference to FIG. 12, the transmission process will be described. The CPU 41 may start to execute the transmission process at step S137 of FIG. 11. The CPU 41 may acquire current time from OS of the information device 13 (step S150). The CPU 41 can specify elapsed time since the transmission process is started, based on the acquired current time.

The CPU 41 may acquire, from the RAM 43, a combination of the service ID, the type information, and the period information (step S151). Alternatively, a plurality of the service IDs may be stored in the RAM 43, when a plurality of the service (e.g., a plurality of the information processing apparatus 12) request the device state information of one information device 13. In this case, the CPU 41 may acquire the plurality of the service IDs. The CPU 41 may specify the elapsed time, and determine whether a period represented by the period information has come or not (step S152). Alternatively, the CPU 41 may determine whether a period, identified by the period information corresponding to at least any one of the plurality of the service IDs, has come or not, when the CPU 41 acquires the plurality of the service IDs at step S151. The CPU 41 may execute step S152 again, when the CPU 41 determines that the period represented by the period information has not come (step S152: NO). The CPU 41 may execute step S152 repeatedly, until the CPU 41 determines that the period represented by the period information has come.

When the CPU 41 determines that the period represented the period information has come (step S152: YES), the CPU 41 may acquire, from the flash memory 44, the device state information associated with the type information corresponding to the determined period information at step S152 (step S153). Furthermore, at step S153, the CPU 41 may acquire the device ID from the ROM 42. Furthermore, at step S153, the CPU 41 may acquire the serial number from the flash memory 44. Furthermore, the CPU 41 may acquire the service ID associated with the determined period information at step S152. The CPU 41 may generate the notification data including the acquired service ID, the acquired device ID, the acquired serial number, and the acquired device state information (step S154).

The CPU 41 may determine whether the information device 13 can communicate with the server 11 or not (step S155). A method for determining whether the information device 13 can communicate with the server 11 may be similar to the method described with respect to step S131 or step S139. The CPU 41 may transmit the generated notification data to the server 11 (step S157), when the CPU 41 determines that the information device 13 can communicate with the server 11 (step S155: YES). After that, the CPU 41 may execute step S159.

The CPU 41 may store the generated notification data in the RAM 43 (step S156), when the CPU 41 determines that the information device 13 cannot communicate with the server 11 (step S155: NO). The CPU 41 may execute step S155 again. The CPU 41 may execute step S155 repeatedly, until the CPU 41 determines that the information device 13 can communicate with the server 11. The CPU 41 may transmit, to the server 11, the notification data which is stored in the RAM 43 (step S157), when the CPU 41 determines that the information device 13 can communicate with the server 11 (step S155: YES). After that, the CPU 41 may execute step S159.

The CPU 41 may determine whether the information device 13 is turned off or not (step S159). The CPU 41 may execute step S151 again, when the CPU 41 determines that the information device 13 is not turned off (step S159: NO). The transmission process may terminate, when the CPU 41 determines that the information device 13 is turned off (step S159: YES).

As described above, the CPU 21 of the server 11 may transmit, to the information device 13, the registering data including the service ID, the type information, and/or the period information at step S43 of FIG. 5. The CPU 21 can transmit, to the information device 13, the type information and/or the period information which are different from each service ID of the information processing apparatus 12. Accordingly, the CPU 21 can receive the device state information corresponding to the type information which may be different for different service IDs, at each period represented by the period information corresponding to the service ID. The CPU 21 can transmit the device state information to the information processing apparatus 12 at an intended timing, by storing, in the HDD 24, the device state information included in the notification data which is received from the information device 13.

The CPU 21 may transmit the registering data including the service ID, the type information, and/or the period information at step S43 of FIG. 5, when the CPU 21 determines that the server 11 can communicate with the information device 13 at step S42 of FIG. 5.

The CPU 21 may transmit, to the information processing apparatus 12, the device state information which is received from the information device 13 immediately at step S55 of FIG. 6, based on flag information associated with the device ID in the table 241 at step S53 of FIG. 6 (e.g., when the CPU 21 determines that the flag information "1" is associated with the device ID in the table 241). Accordingly, the information processing apparatus 12 can receive the device state information from the server 11, at a timing when the information device 13 transmits the device state information.

The CPU 21 can transmit, to the information device 13, the condition response data at step S73 of FIG. 9, when the CPU 21 receives the condition request data from the information device 13. Accordingly, the CPU 41 of the information device 13 can acquire the service ID, the type information, and/or the period information from the server 11, and store the acquired service ID, the acquired type information, and/or the acquired period information in the RAM 43 again, even though the information device 13 is turned off, and the service ID, the type information, and the period information are deleted from the RAM 43.

Configurations of servers, apparatuses, and devices and flowcharts of various processes depicted in the drawings do not limit the aspects of the disclosure but merely illustrate the aspects of the disclosure. As described above, in some embodiments, the CPU 21 may transmit, to the information device 13, the registering data including the period information at step S43 of FIG. 5. Then, the CPU 41 of the information device 13 may store, in the RAM 43, the period information included in the received registering data at step S136 of FIG. 11. At step S157 of FIG. 12, the CPU 41 may also transmit the notification data at a period represented by the period information stored in the RAM 43. The CPU 41 may include, in the registering data, other information representing a transmission condition for controlling the transmitting of the notification data in addition to or alternative to the period information.

In some embodiments, the CPU 21 may transmit the registering data to the information device 13 at step S43 of FIG. 5, when the CPU 21 determines that the server 11 can communicate with the information device 13 at step S42 of FIG. 5. However, the CPU 21 may transmit the registering data to the information device 13, regardless of whether the server 11 can communicate with the information device 13 or not. For example, the CPU 21 may determine whether the information device 13 receives the registering data or not, by determining whether an acknowledgment signal ACK corresponding to transmitted registering data is received or not. The CPU 21 may retransmit the registering data to the information device 13, when the CPU 21 determines that the acknowledgment signal ACK is not received.

In some embodiments, the CPU 41 may transmit the notification data to the server 11 at step S157 of FIG. 12, when the CPU 41 determines that the information device 13 can communicate with the server 11 at step S155 of FIG. 12. However, the CPU 41 may transmit the notification data to the server 11, regardless of whether the information device 13 can communicate with the server 11 or not. For example, the CPU 41 may determine whether the server 11 receives the notification data or not, by determining whether an acknowledgment signal ACK corresponding to transmitted notification data is received or not. The CPU 41 may retransmit the notification data to the server 11, when the CPU 41 determines that such an acknowledgement signal ACK is not received.

What is claimed is:

1. A system comprising:
   a server; and
   an information device,
   wherein the server comprises:
      at least one first processor; and
      a first memory storing first computer-readable instructions therein that, when executed by the at least one first processor, cause the server to:
         receive, from a service providing apparatus, first information comprising:
            service identification information for identifying the service providing apparatus;
            device identification information for identifying the information device;
            type information identifying a type of device state information representing a state of the information device, and
            a transmission condition representing a condition that causes the information device to transmit the device state information;
         store the device identification, the type information, and the transmission condition in association with the service identification information, in a memory; and
         transmit, to the information device identified by the device identification information, the type information and the transmission condition;
   wherein the information device comprises:
      at least one second processor; and
      a second memory storing second computer-readable instructions therein that, when executed by the at least one second processor, cause the information device to:
         receive the type information and the transmission condition from the server;
         store the received type information and the received transmission condition in a memory; and
         transmit, to the server, the device state information related to the stored type information in response to determining that the transmission condition stored in the second memory is satisfied;
      wherein the first computer-readable instructions, when executed by the at least one first processor, cause the server to:

receive, from the information device, the device state information;

store, in a memory, the received device state information in association with the device identification information identifying the information device; and transmit, to the service providing apparatus, the device state information received from the information device.

2. The system according to claim 1, further comprising:
a plurality of information devices, wherein the information device is one of the plurality of information devices,
wherein the device identification information identifies the information device from among the plurality of information devices,
wherein the service providing apparatus is one of a plurality of service providing apparatuses connected to the server via a network, and
wherein the service identification information identifies the service providing apparatus from among the plurality of service providing apparatuses.

3. The system according to claim 1,
wherein the second computer-readable instructions, when executed by the at least one second processor, cause the information device to:
transmit, to the server, a request comprising the device identification information in response to determining that one or more of the type information and the transmission condition are deleted from a memory of the information device;
wherein the first computer-readable instructions, when executed by the at least one first processor, cause the server to:
receive, from the information device, the request comprising the device identification information; and
transmit, to the information device, at least one of the type information and the transmission condition associated with the device identification information, in response to receiving the request from the information device;
wherein the second computer-readable instructions, when executed by the at least one second processor, cause the information device to:
receive, from the server, the at least one of the type information and the transmission condition; and
store the received at least one of the type information and the transmission condition in a memory of the information device.

4. The system according to claim 1,
wherein the second computer-readable instructions, when executed by the at least one second processor, cause the information device to:
determine whether the information device is communicating with the server;
store the device state information related to the type information stored in a memory of the information device in response to determining that the information device is not communicating with the server; and
transmit, to the server, the stored device state information in response to determining that the information device is communicating with the server.

5. A non-transitory computer-readable medium storing computer-readable instructions that, when executed by at least one processor, cause a server to:

receive, from a service providing apparatus, first information comprising:
service identification information for identifying the service providing apparatus;
device identification information for identifying an information device;
type information for identifying a type of device state information representing a state of the information device; and
a transmission condition representing a condition that causes the information device to transmit the device state information;
store the device identification, the type information, and the transmission condition in association with the service identification information, in a memory of the server;
transmit, to the information device identified by the device identification information, the type information and the transmission condition;
receive, from the information device, the device state information related to the type information;
store, in the memory, the received device state information in association with the device identification information identifying the information device; and
transmit, to the service providing apparatus, the device state information received from the information device.

6. The non-transitory computer-readable medium according to claim 5,
wherein the service providing apparatus is one of a plurality of service providing apparatuses connected to the server via a network,
wherein the service identification information identifies the service providing apparatus from among the plurality of service providing apparatuses,
wherein the information device is one of a plurality of information devices connected to the server via a network, and
wherein the transmitting of the type information and the transmission condition comprises transmitting, to the information device from among the plurality of information devices based on the device identification information, the type information and the transmission condition.

7. The non-transitory computer-readable medium according to claim 5,
wherein the computer-readable instructions, when executed by the at least one processor, further cause the server to:
receive, from the service providing apparatus, a request comprising the device identification information and the type information; and
wherein transmitting the device state information comprises transmitting, to the service providing apparatus, the device state information associated with the device identification information and the type information in the memory.

8. The non-transitory computer-readable medium according to claim 5, wherein the computer-readable instructions, when executed by the at least one processor, further cause the server to:
receive, from the service providing apparatus, a request comprising the service identification information of the service providing apparatus; and
acquire, from the memory, the device identification information and the type information using the service identification information, wherein transmitting the device state information comprises transmitting, to the service providing apparatus, the device state information associated with the acquired device identification information and the acquired type information.

9. The non-transitory computer-readable medium according to claim 5,
wherein the computer-readable instructions, when executed by the at least one processor, further cause the server to determine whether the server is communicating with the information device identified by the device identification information; and
wherein the transmitting of the type information and the transmission condition to the information device comprises transmitting the type information and the transmission condition to the information device in response to determining that the server is communicating with the information device.

10. The non-transitory computer-readable medium according to claim 5,
wherein the receiving of the first information comprises receiving setting information;
wherein the computer-readable instructions, when executed by the at least one processor, further cause the server to:
store the setting information in association with the service identification information in the memory; and
determine, in response to receiving the device state information, whether the setting information indicates that the device state information is to be transmitted; and
wherein transmitting the device state information comprises transmitting, to the service providing apparatus identified by the service identification information, the received device state information in response to determining that the setting information indicates that the device state information is to be transmitted.

11. The non-transitory computer-readable medium according to claim 5, wherein, the computer-readable instructions, when executed by the at least one processor, further cause the server to:
receive, from the information device, a request comprising the device identification information identifying the information device; and
transmit, to the information device, at least one of the type information and the transmission condition associated with the device identification information in the memory in response to receiving the request from the information device.

12. The non-transitory computer-readable medium according to claim 5,
wherein the device state information represents an amount of printing performed by the information device or a state of a consumable supply of consumer goods of the information device.

13. A server comprising:
at least one processor; and
a memory storing computer-readable instructions therein that, when executed by the at least one processor, cause the server to:
receive, from a service providing apparatus, first information comprising:
service identification information for identifying the service providing apparatus;
device identification information for identifying an information device,
type information identifying a type of device state information representing a state of the information device, and
a transmission condition representing a condition that causes the information device to transmit the device state information;
store the device identification, the type information, and the transmission condition in association with the service identification information, in the memory;
transmit, to the information device identified by the device identification information, the type information and the transmission condition;
receive, from the information device, the device state information related to the type information;
store, in the memory, the received device state information in association with the device identification information identifying the information device; and
transmit, to the service providing apparatus, the device state information received from the information device.

14. The server according to claim 13,
wherein the service providing apparatus is one of a plurality of service providing apparatuses connected to the server via a network,
wherein the service identification information identifies the service providing apparatus from among the plurality of service providing apparatuses,
wherein the information device is one of a plurality of information devices connected to the server via a network, and
wherein the transmitting of the type information and the transmission condition comprises transmitting, to the information device from among the plurality of information devices based on the device identification information, the type information and the transmission condition.

15. The server according to claim 13,
wherein the computer-readable instructions, when executed by the at least one processor, further cause the server to:
receive, from the service providing apparatus, a request comprising the device identification information and the type information; and
wherein transmitting the device state information comprises transmitting, to the service providing apparatus, the device state information associated with the device identification information and the type information in the memory.

16. The server according to claim 13,
wherein the computer-readable instructions, when executed by the at least one processor, further cause the server to determine whether the server is communicating with the information device identified by the device identification; and
wherein the transmitting of the type information and the transmission condition to the information device comprises transmitting the type information and the transmission condition to the information device in response to determining that the server is communicating with the information device.

17. The server according to claim 13,
wherein the receiving of the first information comprises receiving setting information;
wherein the computer-readable instructions, when executed by the at least one processor, further cause the server to:

store the setting information in association with the service identification information in the memory; and determine, in response to receiving the device state information, whether the setting information indicates that the device state information is to be transmitted; and wherein transmitting the device state information comprises transmitting, to the service providing apparatus identified by the service identification information, the received device state information in response to determining that the setting information indicates that the device state information is to be transmitted.

18. The server according to claim 13, wherein the computer-readable instructions, when executed by the at least one processor, further cause the server to:

receive, from the information device, a request comprising the device identification information identifying the information device; and transmit, to the information device, at least one of the type information and the transmission condition associated with the device identification information in the memory in response to receiving the request from the information device.

19. The server according to claim 13, wherein the device state information represents an amount of printing performed by the information device or a state of a consumable supply of consumer goods of the information device.

20. The server according to claim 13, wherein the computer-readable instructions, when executed by the at least one processor, further cause the server to:

receive, from the information device, a request comprising the device identification information after one or more of the type information and the transmission condition are deleted from a memory of the information device; and transmit, to the information device, at least one of the type information and the transmission condition associated with the device identification in memory, in response to receiving the request.

* * * * *